(12) United States Patent
Munding et al.

(10) Patent No.: US 11,988,577 B2
(45) Date of Patent: May 21, 2024

(54) CERTIFIED VAPOR RECOVERY

(71) Applicant: FLOGISTIX, LP, Oklahoma City, OK (US)

(72) Inventors: Paul Munding, Oklahoma City, OK (US); Aaron Baker, Pampa, TX (US); Soobin Kim, Oklahoma City, OK (US); Mims Brooks Talton, III, Oklahoma City, OK (US)

(73) Assignee: Flogistix, LP, Oklahoma City, OK (US)

( * ) Notice: Subject to any disclaimer, the term of this patent is extended or adjusted under 35 U.S.C. 154(b) by 0 days.

(21) Appl. No.: 18/036,726

(22) PCT Filed: Nov. 19, 2021

(86) PCT No.: PCT/US2021/060154
§ 371 (c)(1),
(2) Date: May 12, 2023

(87) PCT Pub. No.: WO2022/109308
PCT Pub. Date: May 27, 2022

(65) Prior Publication Data
US 2023/0393018 A1 Dec. 7, 2023

Related U.S. Application Data

(60) Provisional application No. 63/115,646, filed on Nov. 19, 2020.

(51) Int. Cl.
*G01M 3/26* (2006.01)
*F17C 13/02* (2006.01)

(52) U.S. Cl.
CPC .............. *G01M 3/26* (2013.01); *F17C 13/025* (2013.01); *F17C 13/026* (2013.01);
(Continued)

(58) Field of Classification Search
CPC ....... G01M 3/26; F17C 13/025; F17C 13/026; F17C 2205/0323; F17C 2221/032; F17C 2227/0157; F17C 2227/0302; F17C 2250/032; F17C 2250/043; F17C 2250/0439; F17C 2250/0443; F17C 2260/044
See application file for complete search history.

(56) References Cited

U.S. PATENT DOCUMENTS 5,499,531 A * 3/1996 Henderson ......... G01N 33/2829
73/19.01
5,719,785 A * 2/1998 Standifer ............... G01M 3/243
702/140

(Continued)

FOREIGN PATENT DOCUMENTS

CN 111860938 A 10/2020
WO 2014173599 A2 10/2014

*Primary Examiner* — Douglas Kay
(74) *Attorney, Agent, or Firm* — McAfee & Taft

(57) ABSTRACT

Disclosed is a system and method for monitoring a hydrocarbon storage system. The system and method for using the system allows the operator to determine if any undesired releases of gaseous hydrocarbons are occurring. The method utilizes a computer programmed with a process simulator function suitable for miming equations of state and determining the unwanted release of hydrocarbons from a hydrocarbon storage system.

7 Claims, 6 Drawing Sheets

(52) U.S. Cl.
CPC ............. *F17C 2205/0323* (2013.01); *F17C 2221/032* (2013.01); *F17C 2227/0157* (2013.01); *F17C 2227/0302* (2013.01); *F17C 2250/032* (2013.01); *F17C 2250/043* (2013.01); *F17C 2250/0439* (2013.01); *F17C 2250/0443* (2013.01); *F17C 2260/044* (2013.01)

(56) References Cited

U.S. PATENT DOCUMENTS

| | | | |
|---|---|---|---|
| 5,883,815 A | 3/1999 | Drakulich et al. | |
| 8,992,838 B1 * | 3/2015 | Mueller | B01J 8/001 |
| | | | 422/129 |
| 9,334,109 B1 * | 5/2016 | Mueller | C10G 5/06 |
| 9,764,255 B1 * | 9/2017 | Mueller | C10L 3/101 |
| 9,776,155 B1 * | 10/2017 | Mueller | B01J 8/0496 |
| 10,745,266 B1 * | 8/2020 | Vernon | F23G 7/06 |
| 2004/0248307 A1 | 12/2004 | Grof et al. | |
| 2007/0283870 A1 | 12/2007 | Lovie et al. | |
| 2008/0047871 A1 | 2/2008 | Brons et al. | |
| 2015/0267129 A1 * | 9/2015 | Meyer | C10G 53/02 |
| | | | 431/202 |
| 2018/0217615 A1 | 8/2018 | Westmoreland | |
| 2019/0211662 A1 | 7/2019 | Elmer | |
| 2020/0133251 A1 | 4/2020 | Rossi | |

* cited by examiner

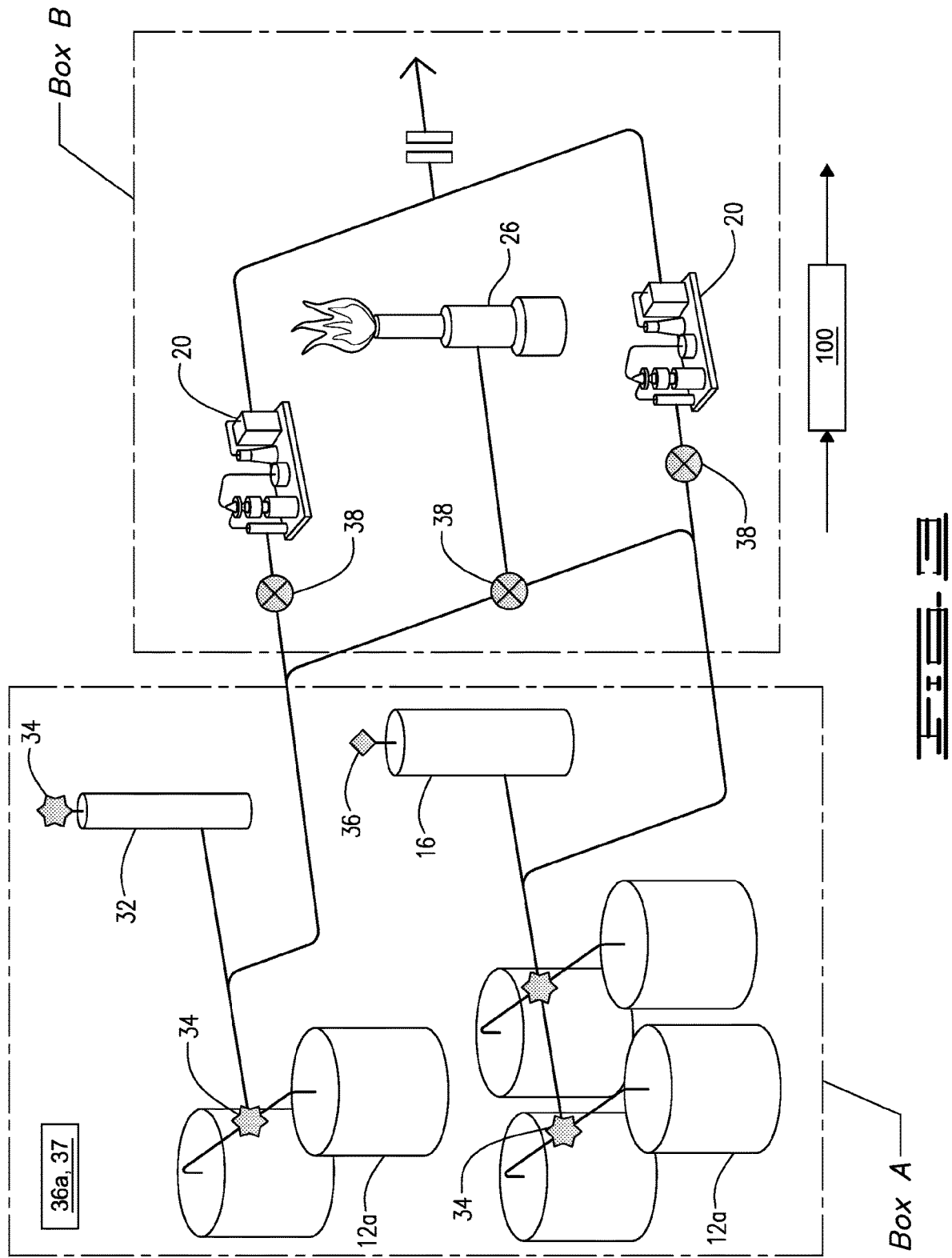

CERTIFIED VAPOR RECOVERY

CROSS REFERENCE TO RELATED APPLICATION

The present application claims priority to U.S. Provisional Application No. 63/115,646 filed on Nov. 19, 2020, which is hereby incorporated by reference.

BACKGROUND

Conventional well-site and other hydrocarbon storage systems typically include a plurality of units designed to store and process hydrocarbon fluids. Such units include, but are not limited to: tank batteries 12, more particularly hydrocarbon storage tanks 12a and produced water storage tanks 12b, separators 14, heater treaters 16, blenders or mixers 18, compressors 20, gaseous hydrocarbon splitters 22, flare/scrubbers 24, flares 26, valves 28 suitable for controlling fluid flow into and/or out of various units, vapor recovery towers or other separation vessels 32, pressure sensors 34, temperature sensors 36 and flow meters 38 (flow meters 38 may be physical meters placed to directly monitor fluid flow or virtual, relying upon input from automated equipment conditions such as a compressor to calculate the fluid flow rate). As will be recognized by those skilled in the art, each of the foregoing components and the operation thereof are well known to those skilled in the art. Additionally, those skilled in the art will also recognize the need to contain and preclude the inadvertent release of gaseous hydrocarbons to the atmosphere.

Current methods and systems for identifying and tracking releases of gaseous hydrocarbons from well-site and other hydrocarbon storage systems 10 rely upon expensive infrared monitoring systems. Typically, the cost of monitoring a hydrocarbon storage system 10 with an infrared monitoring system can run about $3000 per day or more. Additionally, such systems can be hampered by weather conditions resulting in delayed detection of hydrocarbon releases. Therefore, a monitoring system which does not rely upon infrared sensors to detect gaseous hydrocarbon releases will provide a significant improvement in reducing hydrocarbon releases and while also saving the industry thousands of dollars on a daily basis per location.

SUMMARY

In one embodiment the present disclosure describes a method for identifying unwanted venting of gaseous hydrocarbons from a hydrocarbon storage system. The method comprises the steps of:
  providing a database for storage of pressure, flow rate and temperature data;
  providing a central processor programmed to perform a process simulator function and mass balance operations, the process simulator function programmed to run equations of state and to receive data from said database for use in the equations of state;
  providing a site-specific schematic of said hydrocarbon storage system for use by said process simulator function;
  said site-specific schematic of said hydrocarbon storage system identifies at least one onsite unit selected from the group consisting of:
    a compressor associated with a hydrocarbon vapor recovery line;
    a flare associated with a hydrocarbon vapor recovery line;
    a flare associated with a crude oil storage tank;
    a flare associated with a produced water storage tank;
    a storage unit potentially containing hydrocarbon vapors;
    a processing unit in said hydrocarbon storage system which produces or isolates hydrocarbon vapors;
    a temperature sensor associated with a storage unit potentially containing hydrocarbon vapors, wherein each temperature sensor provides data to said database;
    a temperature sensor associated with a processing unit which produces or isolates hydrocarbon vapors, wherein each temperature sensor provides data to said database;
    a flow sensor associated with conduits into and out of each storage unit potentially containing hydrocarbon vapors, wherein each flow sensor provides data to said database;
    a flow sensor associated with conduits into and out of each processing unit which produces or isolates hydrocarbon vapors, wherein each flow sensor provides data to said database;
    a flow sensor associated with conduits into and out of each compressor associated with a hydrocarbon recovery line, wherein each flow sensor provides data to said database;
    a flow sensor associated with conduits into and out of each compressor associated with a hydrocarbon storage tank, wherein each flow sensor provides data to said database;
    a flow sensor associated with conduits into and out of each compressor associated with a hydrocarbon processing unit, wherein each flow sensor provides data to said database;
    a pressure sensor associated with conduits into and out of each storage unit potentially containing hydrocarbon vapors, wherein each pressure sensor provides data to said database;
    a pressure sensor associated with conduits into and out of each processing unit which produces or isolates hydrocarbon vapors, wherein each pressure sensor provides data to said database;
  receiving fluids;
  identifying the makeup of the received fluids in terms of gaseous and liquid hydrocarbons and any aqueous fluids entering the hydrocarbon storage system;
  input the relative percentages of gaseous and liquid hydrocarbons and aqueous fluids of the received fluids into said database for use by said process simulator function;
  monitoring the total gas volume processed by each compressor using a virtual or real flow meter;
  set a user defined total error percentage for the flow sensors (TOTAL ERROR %);
  using the flowrate data from each flow sensor as stored in the database, determine the total metered hydrocarbon vapor volume (TVM) handled by the hydrocarbon storage system;
  using the process simulator function to run the equations of state, compute the Process Simulator Rate in terms of volume handled by the hydrocarbon storage system where the Process Simulator Rate volume of the hydrocarbon system equals the total estimated volume of vapors flashing on site from any tanks or vessels producing or storing any liquid HC that could change to gas and be fed to into the vapor recovery system;

performing mass balance operations compute the total vent volume of all storage and processing units in the hydrocarbon storage system where the total vent volume is PSR−TVM±TOTAL ERROR %;

determining if unwanted venting of gaseous hydrocarbons has occurred where unwanted venting is indicated when the total vent volume is greater than zero

BRIEF DESCRIPTION OF THE DRAWINGS

FIG. 3 depicts an exemplary non-limiting example of a hydrocarbon storage system.

DETAILED DESCRIPTION

Figure 1A:
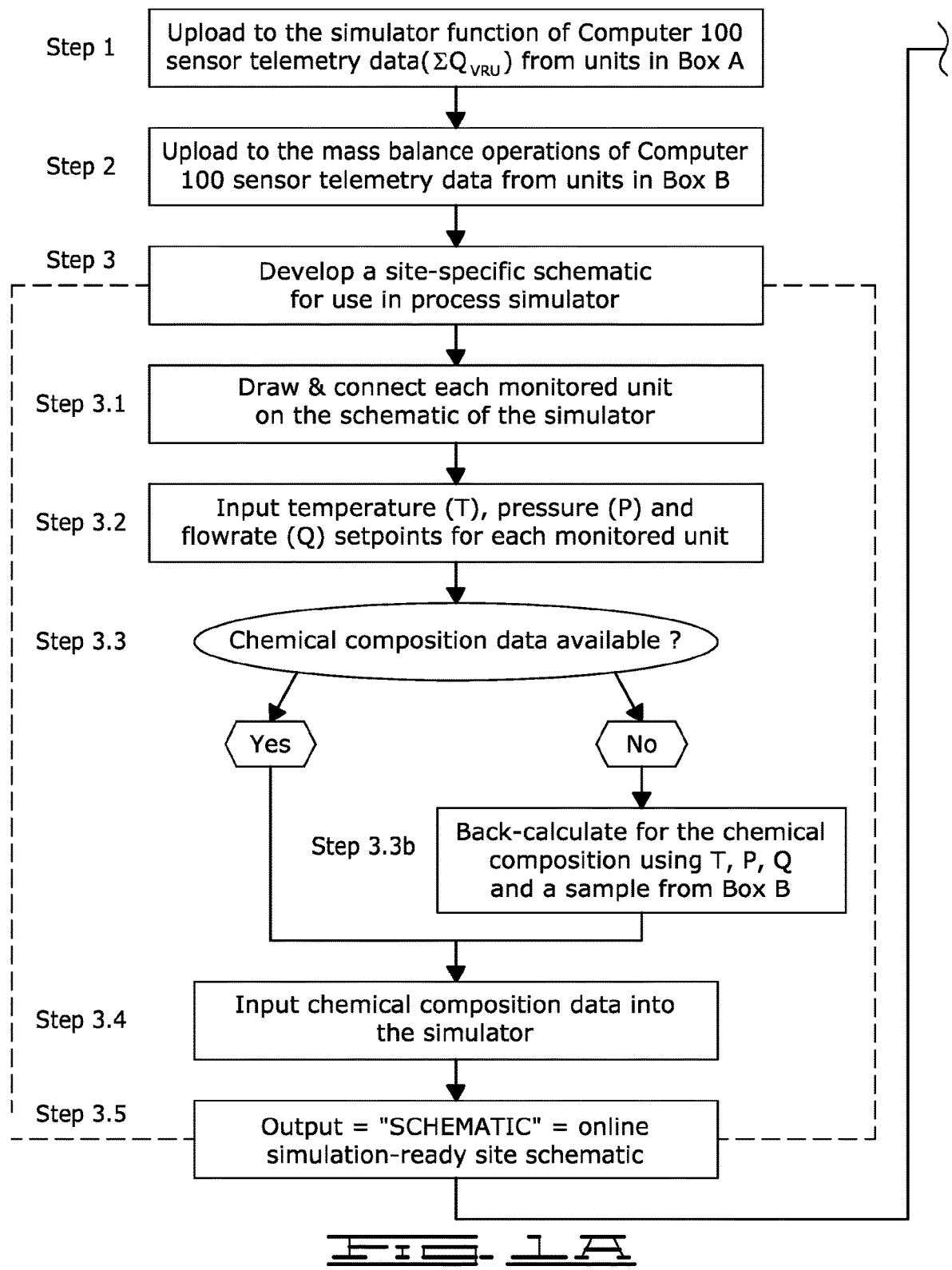
FIGS. 1A-C represent a process flow diagram of the steps for monitoring and detecting releases of gaseous hydrocarbon from a hydrocarbon storage system as implemented within a central processing unit or computer system.

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure. The drawings are not necessarily to scale.

The present disclosure may be understood more readily by reference to these detailed descriptions. For simplicity and clarity of illustration, where appropriate, reference numerals may be repeated among the different figures to indicate corresponding or analogous elements. In addition, numerous specific details are set forth in order to provide a thorough understanding of the various embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

Figure 2A:
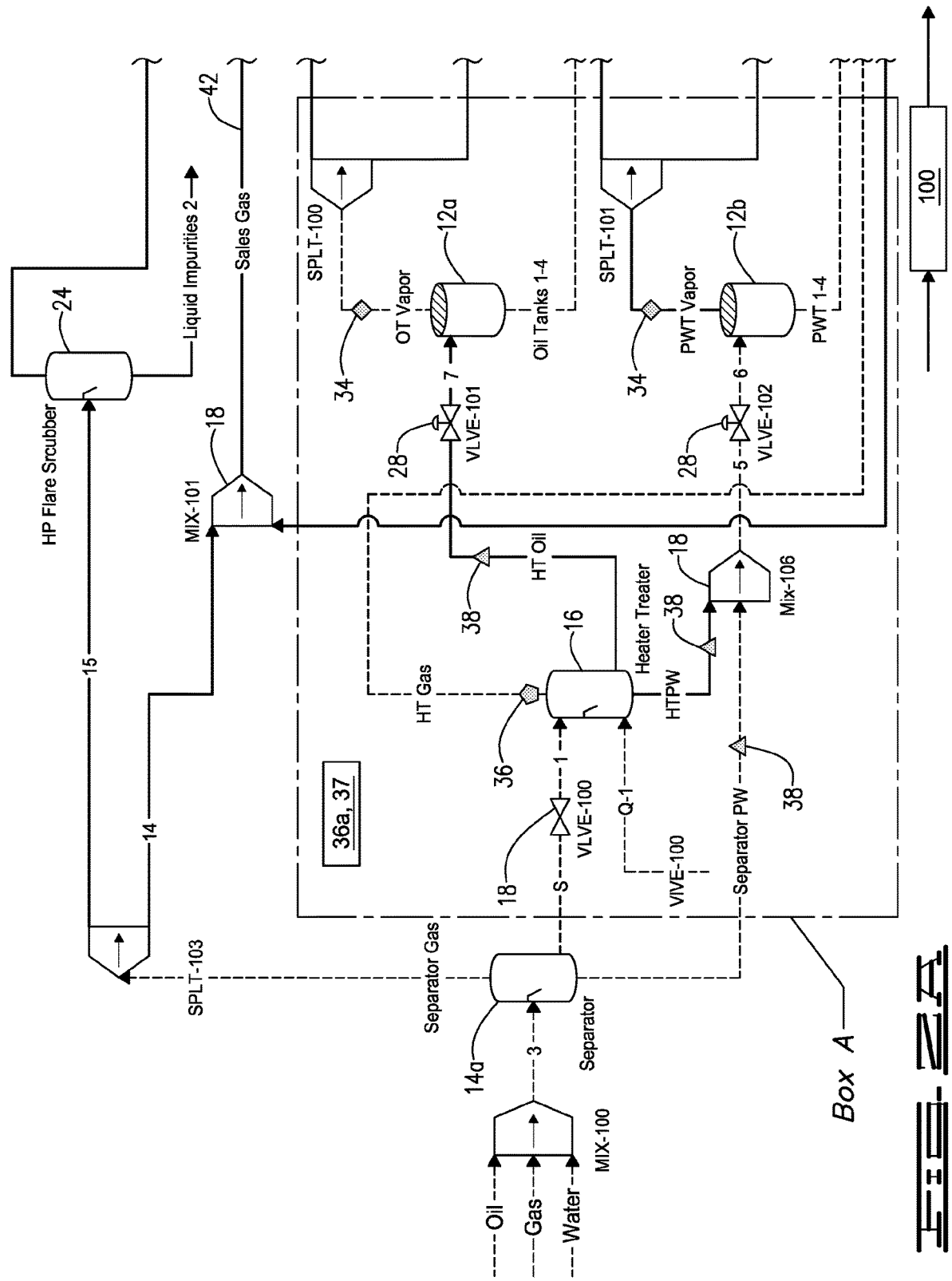
FIGS. 2A-B depict an exemplary non-limiting example of a well-site storage system.
Figure 2B:
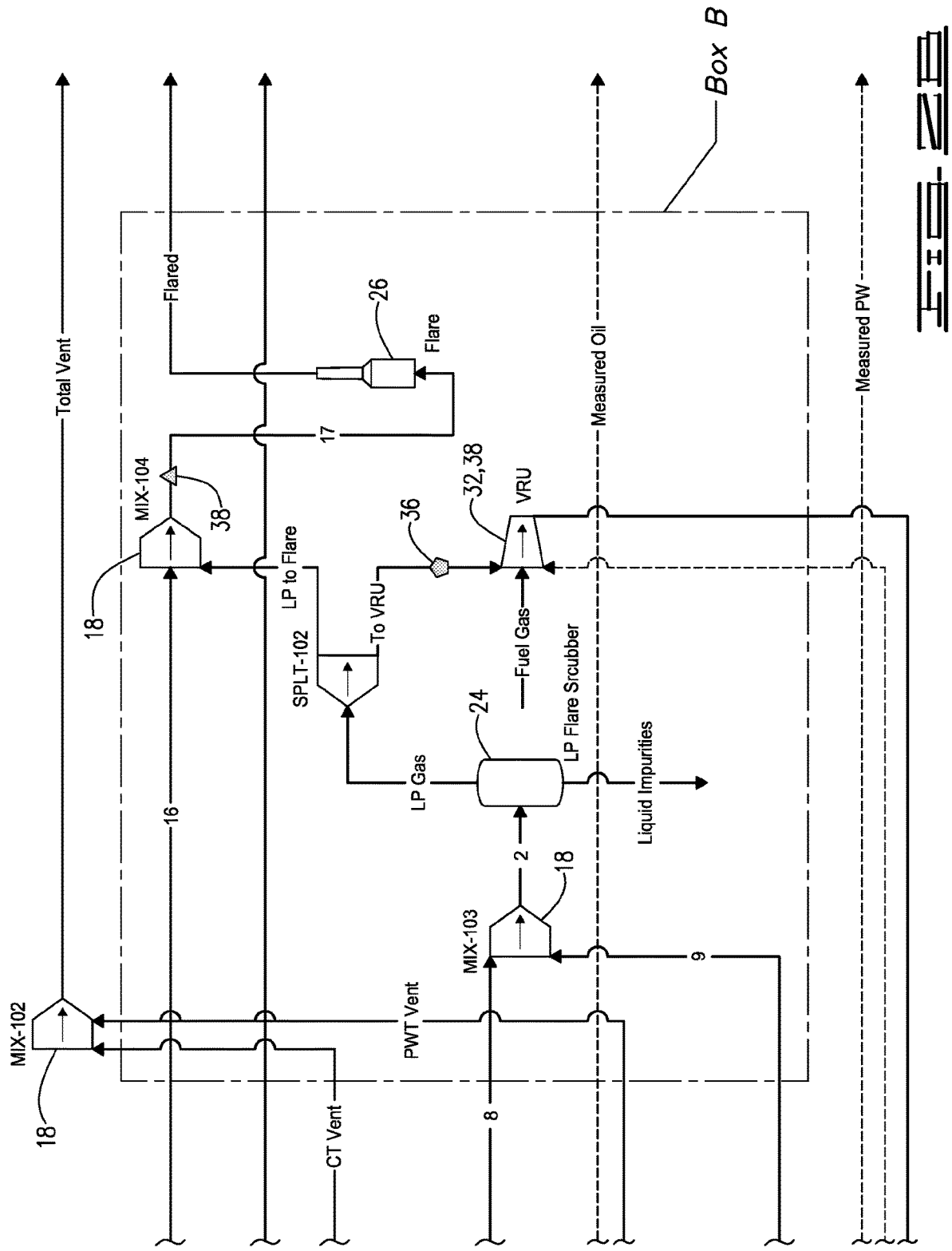

As depicted, in FIGS. 2A-B and 3, the system for monitoring and detecting gaseous hydrocarbon releases from a well-site or hydrocarbon storage system 10 appears in many ways to be a conventional storage system. Improved well-site storage system 10 includes units, such as but not limited to: tank batteries 12, more particularly hydrocarbon storage tanks 12a and produced water storage tanks 12b, separators 14, heater treaters 16, blenders or mixers 18, compressors 20, gaseous hydrocarbon splitters 22, flare/scrubbers 24, flares 26, valves 28 suitable for controlling fluid flow into and/or out of various units, vapor recovery towers or other separation vessels 32, pressure sensors 34, temperature sensors 36 and flow meters 38 (flow meters 38 may be physical meters placed to directly monitor fluid flow or virtual, relying upon input from automated equipment conditions such as a compressor to calculate the fluid flow rate). As will be recognized by those skilled in the art, each of the foregoing components and the operation thereof are well known to those skilled in the art.

Figure 1B:
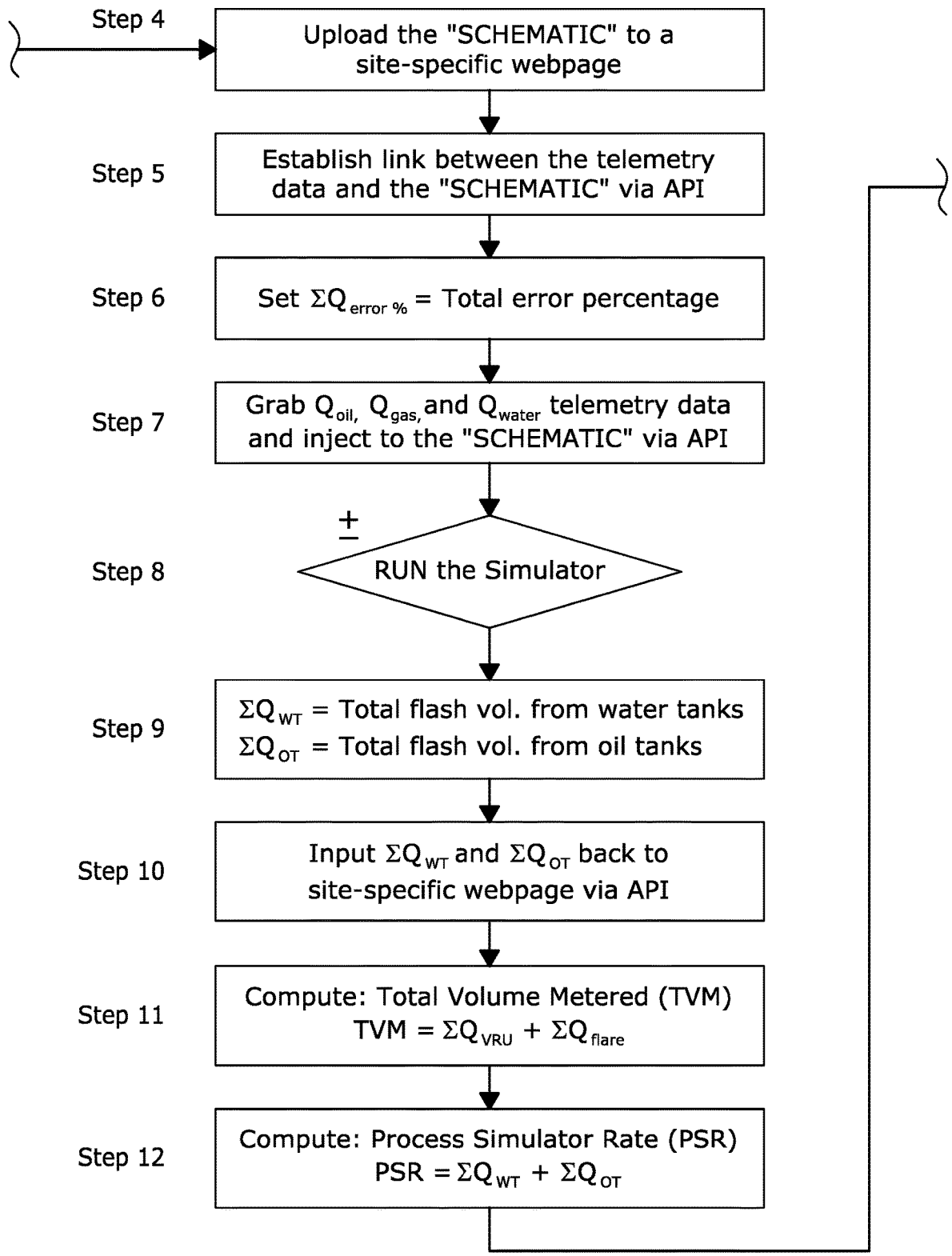
Figure 1C:
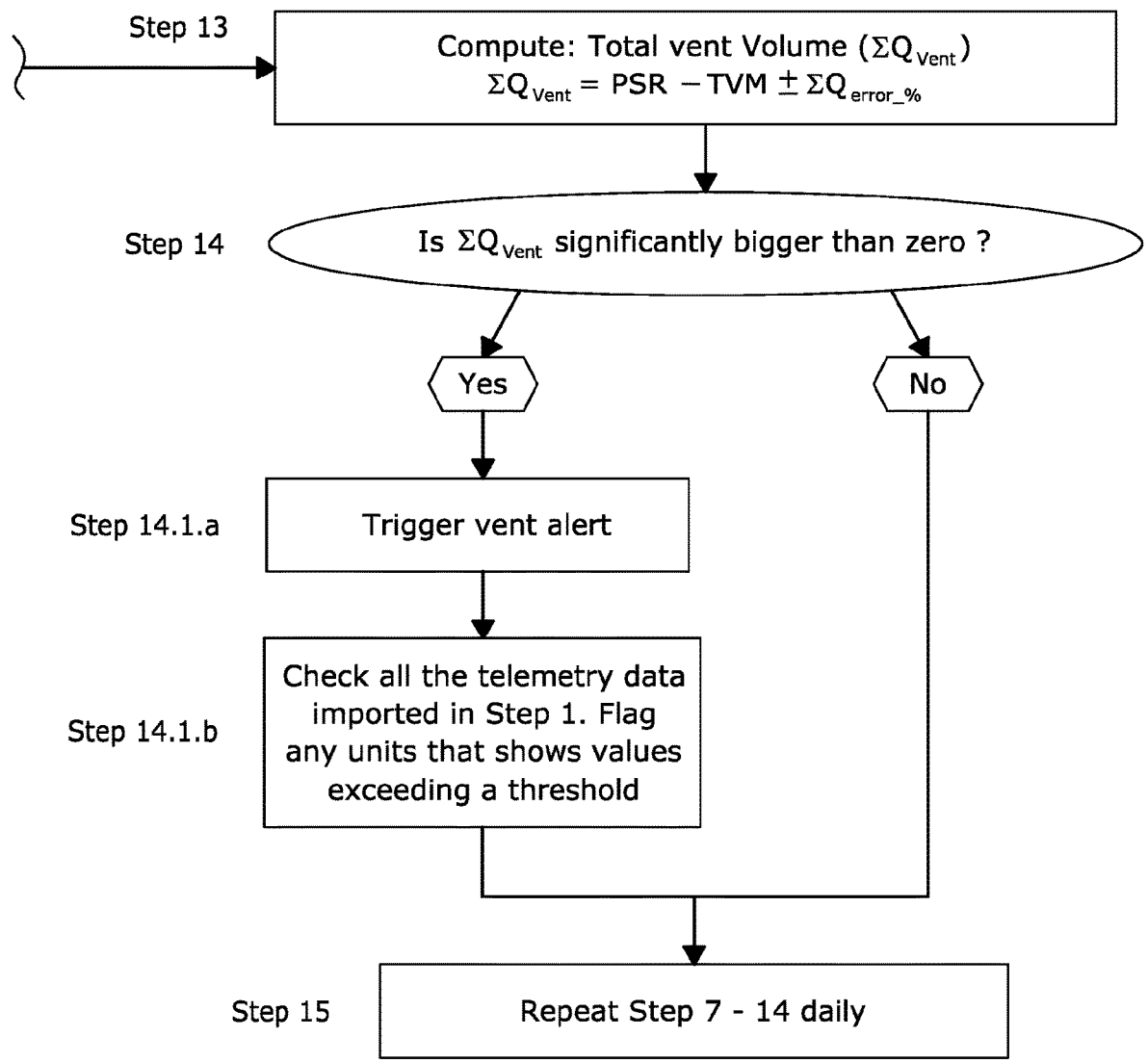

However, in addition to the foregoing units, hydrocarbon storage system 10 includes a central processor or computer 100 programmed to perform the functions outlined by the process flow diagram of FIGS. 1A-C. Computer 100, using a process simulator function or model and mass balance operations, also reports data to a website depicting a schematic of the units forming the hydrocarbon storage system 10. The process simulator function and site schematic will be adjusted to correspond to the units at each hydrocarbon storage system 10. The additional control method disclosed herein provides a significant reduction in releases of hydrocarbon gases. As a result, the disclosed method enhances the commercial value of hydrocarbon storage system 10 while also improving the environment.

Computer 100 is associated with a database suitable for storing and accessing telemetry data received from pressure sensors 34, temperature sensors 36 and flow meters 38. Additionally, user defined data such as Total Error Percentage ($\Sigma Q_{error\%}$) identified in step 6 of FIG. 1B and the value for Total Vent Volume ($\Sigma Q_{vent}$), i.e. the volume of vent gases released, necessary to trigger a vent alert may be initially manually input into the database associated with computer or automatically input via link from the process simulator model. NOTE: as used herein, vent gases are also known as flash gases or flash volume. As described below in the discussion of the method of operating improved well-site storage system 10, Total Error Percentage and Total Vent Volume will subsequently be defined empirically following development of sufficient data by actually operating well-site storage system 10 with computer 100 actively monitoring data provided by pressure sensors 34, temperature sensors 36 and flow meters 38.

As known to those skilled in the art, the nature of the hydrocarbons received and stored will determine the specific units needed in each hydrocarbon storage system 10. The units commonly found in hydrocarbon storage system 10 are discussed above. The nature of each respective unit will determine the type of sensors monitoring the unit. Thus, each of the following units will be monitored by at least one pressure sensor 34: hydrocarbon storage tanks 12a, produced water storage tanks 12b, vapor recovery towers or other separation vessels 32, and heater treaters 16. NOTE: optionally, when hydrocarbon storage tanks 12a are grouped as a battery of tanks, a single pressure sensor 34 may be positioned within a fluid flow line joining the tanks as opposed to utilizing a pressure sensor on each individual tank 12a. Likewise, a single pressure sensor 34 may optionally be used to monitor a battery of produced water storage tanks 12b. Generally, use of pressure sensors 34 on each storage vessel will improve accuracy and aid in identification of any leaks. Each of the following units will be monitored by at least one temperature sensor 36: hydrocarbon storage tanks 12a, produced water storage tanks 12b, vapor recovery towers or other separation vessels 32 and heater treaters 16. For all phases of hydrocarbons and water (aqueous fluids) passing through the system, actual or virtual flow meters 38 will be associated with the outlets of at least one primary separator 14a and/or heater treater 16. Thus, liquid and gaseous hydrocarbon flow rates and water (aqueous) flow rate from primary separator 14a are monitored by flow meters 38. Alternatively, such flow meters may be associated with the outlet lines of a heater treater 16 when such a unit is used as a primary separator upstream of Box A. The gas flow produced in the hydrocarbon storage system 10 by separators 14 leading to the sales line 42, vapor recovery units 32 and flares 26 may also be monitored by flow meters 38. Additionally, ambient air temperature at hydrocarbon storage system 10 will be monitored by a separate temperature sensor 36a located at any convenient location within hydrocarbon storage system 10. Finally, a barometric pressure sensor 37 may be located at any convenient location within hydrocarbon storage system 10. For example, temperature sensor 36a and barometric pressure sensor 37 may be mounted to a compressor skid (not shown) in a manner that compressor 20 does not influence the monitoring of ambient conditions.

As outlined in the process flow diagram of FIGS. 1A-C, the process simulator function of computer 100 will be programmed to utilize the data received from pressure sensors 34, temperature sensors 36 and flow meters 38 in site specific process simulator function. Optionally, the process simulator function may also utilize site data obtained from site temperature sensor 36a and barometric sensor 37. The process simulator function reports data via a schematic displayed as a webpage or GUI on a monitor corresponding to the configuration of hydrocarbon storage system 10 being monitored. Thus, the schematic represents each unit, sensor and valve of hydrocarbon storage system 10. As hydrocarbons flow into and are processed or stored in hydrocarbon storage system 10, the physical storage site is a dynamic system with constantly changing variables. During operation of hydrocarbon storage system 10, computer 100 runs the site specific process simulator function and performs equations of state as outlined in FIGS. 1A-C to determine the mathematical state of the dynamic system, i.e. the nature of the hydrocarbons passing through the units of the system. As outlined in FIGS. 1A-C and will be described in more detail below, the process simulator function and mass balance operations of computer 100 provides the ability to monitor vented gaseous hydrocarbons, also known as flash gas, and optionally signal an alert or highlight the release via the website. See steps 13 and 14 of FIG. 1C.

In a broad overview, the simulator function running within computer 100 uses inputs from the sensors associated with the identified units (Box A of FIGS. 2A and 3) to generate and report gas estimates resulting from these units on the schematic of the site as displayed on a webpage or GUI managed by computer 100. For example, as reflected in FIGS. 2A-B, gas from hydrocarbon storage tanks 12a and gas from produced water tanks 12b (Box A units) passes to processing units such as a flare 26 and compressor 20 in Box B. The mass balance operations are performed using data from flow rate meters and other sensors of units in Box B as depicted in FIGS. 2B and 3. As described in more detail below, the volumes of gas from storage units such as hydrocarbon storage tanks 12a, produced water tanks 12b, separators 14, heater treaters 16 and other similar storage vessels in Box A should generally equal the volume of gas processed by subsequent downstream processing units such as flare/scrubbers 24, flares 26, vapor recovery towers 32 and compressors 20 in Box B. Thus, computer 100, using the process simulator function and mass balance operations, compares the values produced by storage units in Box A to values produced by processing units in Box B to identify undesired leaks of gaseous hydrocarbons and the likely location of the leaks. The comparison utilizes the steps set forth in FIGS. 1A-C.

The operation of hydrocarbon storage system 10 will be described with reference to FIGS. 1-3. FIGS. 2A-B and 3 are merely exemplary of two typical hydrocarbon storage sites. Other configurations of hydrocarbon storage system 10 may also be serviced by the operational method disclosed herein. As reflected in FIG. 2A, hydrocarbon storage system 10 receives crude hydrocarbons from a well (not shown) or a pipeline (not shown). Typically, crude hydrocarbons are initially received by primary separator 14a of hydrocarbon storage system 10. Subsequently, the separated fluid streams are passed to the respective units in hydrocarbon storage system 10 for further processing, storage or transition to a sales line 42. These units such as separator 14, heater treater 16, hydrocarbon storage tanks 12a, produced water storage tanks 12b, flare/scrubbers 24 and flares 26 all operate in a conventional manner. Those skilled in the art will recognize that the layout of the various units in hydrocarbon storage system 10 may vary from site to site and will include different units as dictated by the fluids to be processed and stored. Additionally, as depicted in FIG. 3, the process simulator function of computer system 100 may be adapted for use with tank batteries 12 that are not associated with a well or other direct hydrocarbon production source.

As discussed above, the necessary pressure sensors 34, temperature sensors 36 and flow rate meters 38 are installed on the desired units. Each sensor is linked by a wired or wireless connection to computer system 100. Additionally, a site specific schematic is uploaded to computer system 100. In one embodiment, the site specific schematic may be displayed as a webpage within any common web browser depicting each unit found in hydrocarbon storage system 10. Each sensor may also be displayed on the webpage. Computer system 100 includes an internal or external interactive database suitable for storing and retrieving data provided by the various sensors of hydrocarbon storage system 10. Computer system 100 further includes a process simulator function programmed to receive data from the database. The process simulator function is programmed to represent the probable or likely vapor resulting (flash volume) from units within Box A as monitored by the hydrocarbon storage system 10. One commercially available software package capable of performing the described process simulator function, is called ProMax® available from Brian Research and Engineering, LLC. This process simulator function may be configured by a user to carry out the steps of the process flow diagram of FIGS. 1A-C. Operation of the software simulator function corresponds to Steps 1, 3-5 and 7-9 and 12 of the process flow diagram in FIGS. 1A-C and also corresponds to data received from BOX A of FIGS. 2A and 3. The simulator function output is represented graphically on the user's webpage as the part of the site schematic. The remaining steps 2, 6, 10-11 and 13-14, of FIGS. 1A-C are carried out in the separate mass balance operations program. The mass balance operations compare the results of the process simulator function as determined using sensors in Box A to the data reported from sensors in Box B in accordance with process flow steps 6, 10-11 and 13-14. Thus, the method determines if an unwanted leak has occurred.

Hydrocarbon storage systems associated with wells producing hydrocarbons and other storage sites are dynamic systems undergoing constant change in accordance with changes in the makeup of incoming fluids, changes in operational and ambient temperatures, ambient pressure and changes in throughput due to downstream conditions. To accommodate the dynamic nature of hydrocarbon storage system 10, computer system 100, i.e. the process simulator function (also referred to herein simply as the simulator function) of computer 100, is programmed with equations of state. As known to those skilled in the art, equations of state are designed to handle thermodynamic and fluid dynamic equations based on inputs such as volume, temperature, pressure, internal energy and flow rate. One skilled in the art will recognize that many options exist for drafting the necessary coding to carry out the functions outlined in the flow chart of FIGS. 1A-C. In addition to the software available from Brian Research and Engineering, LLC, the software package known as Hysys®, from AspenTech, will also provide the necessary capabilities. Therefore, the following discussion will focus on the unique steps to be performed to identify unwanted venting of gaseous hydrocarbons.

The method disclosed herein provides the ability to track and identify unwanted releases of hydrocarbons from hydrocarbon storage vessels. Venting of hydrocarbon gases from storage systems not only results in undesirable atmospheric pollution but also loss of revenue to the site operator. Therefore, the following method provides a significant improvement for hydrocarbon storage systems. The method will be described with reference to FIGS. 1-3; however, as noted above, the schematics of FIGS. 2A-B and 3 are merely exemplary. The described method is suitable for any hydrocarbon storage site and may receive data from a wider variety of hydrocarbon storage vessels, such as but not limited to stock tanks, bullet tanks and other conventional hydrocarbon storage tanks, as well as a wide variety of processing units commonly associated with such storage vessels, such as but not limited to separators, including heater treaters, vapor recovery towers and other units commonly found in connection with hydrocarbon storage tanks. In general, the sensors associated with the storage vessels will monitor pressure and temperature within the vessels while sensors associated with the processing units will monitor temperature, pressure and flow rates of fluids passing through the units.

With reference to FIG. 1A, steps 1-3 can occur in any order. Additionally, steps 1 and 2 may occur after step 4. As known to those skilled in the art, equations of state relate values of pressure, volume, temperature internal energy and flow rate of monitored gases and liquids. For example, the simplest known equation of state is PV=nRT, where P=pressure, V=volume, T=temperature, R=universal gas constant and n=moles. Through use of the equations of state, one can better understand the operation of a dynamic fluid system and whether or not the system is operating properly. As discussed above, a computer system can be readily programmed to use equations of state corresponding to the process flow diagram set forth in FIGS. 1A-C. The process flow diagram can be adapted to monitor a wide range of units found within hydrocarbon storage systems. The following discussion of the method for monitoring gaseous hydrocarbon releases at a hydrocarbon storage site references FIGS. 2A-B and 3. However, FIGS. 2A-B and 3 are merely exemplary of suitable sites for practicing the method. The makeup of storage vessels and processing units may vary from site to site.

With continued reference to FIG. 1A-C, in Step 1, sensor data provided by pressure sensors 34, temperature sensors 36 and flow rate meters 38 associated with storage vessels 12a, 12b and optionally, processing units such as, but not limited to, separators 14, heater treaters 16, vapor recovery towers 32 located upstream of the storage vessels, i.e. units corresponding to Box A of exemplary FIGS. 2A and 3, is received by the database and becomes accessible to the process simulator function of computer 100. In Step 2 operational data directed to flow rates and volumes passing through various processing units downstream of storage vessels 12a, 12b is provided by flow meters 38, which may be actual or virtual, and other sensors associated with the processing units, i.e. units corresponding to Box B or exemplary FIGS. 2B and 3, to the mass balance operations of computer 100. Processing units commonly found downstream of storage vessels 12a, 12b may include, but are not limited to, compressors 20, flare/scrubbers 24, vapor recovery units 32 and flares 26. Such processing units are commonly associated with the storage vessels being monitored for release of gaseous hydrocarbons. The operational data informs the simulator function of computer 100 as to the quantity of gaseous hydrocarbons expected to evolve from storage vessels 12a, 12b and optionally processing units upstream of storage vessels 12a, 12b. Additionally, the operational data informs the simulator function of the volume of gas being processed by processing units downstream of storage vessels 12a, 12b. Thus, data in Step 1 corresponds to those units and sensors in Box A of FIGS. 2A and 3 while Data in Step 2 corresponds to those units and sensors in Box B of FIGS. 2B and 3.

Step 3 entails the establishment of the site specific schematic. As discussed above, at a minimum the schematic includes all units being monitored for venting of gaseous hydrocarbons, Box A, and all processing units, Box B, found on the hydrocarbon storage site. As depicted in exemplary FIG. 3, hydrocarbon storage site may include, tank batteries 12 and separation vessels, e.g. heater treater 16 and vapor recovery tower 32 are downstream of any primary separator, not shown in FIG. 3, and upstream of tank batteries 12 associated with pressure sensors 34 and temperature sensors 36. Step 3 includes sub-Steps 3.1-3.5. Within Step 3, hydrocarbon storage system 10 establishes the interrelationship of the units being monitored (Step 3.1) and identifies these units within the simulator function used to run the equations of state. To that end, Steps 3.2-3.4 determine the makeup of fluids (aqueous phase/liquid hydrocarbon phase/gaseous hydrocarbon phase) being processed and stored in the simulator function of computer 100. However, if the actual makeup of fluids at the primary separator is not known, then computer 100, using the process simulator function, can back calculate the makeup of the fluids using samples input data corresponding to temperature (T), pressure (P) and flow rate (Q) from the various sensors in hydrocarbon storage system 10 and preferably a sample from the end of the process, i.e. output of Box B. Upon inclusion of the makeup of fluids being processed in Step 3.4, the system prepares the simulation-ready site schematic and uploads the same to the webpage or GUI (Steps 3.5 and 4). The site schematic subsequently receives data on at least a daily basis from the simulator function of computer 100. However, more frequent data input will enhance the accuracy of the method. The site schematic may be managed by computer 100 or by a different operating system in communication with computer 100 as reflected by Step 5.

In Step 5, the operational link between the webpage with the simulation ready site schematic is established. As part of the "going-live" operation of the simulation, Step 6, performed outside of the process simulator function, provides for the determination of an initial acceptable total flowrate error percentage (Total Error Percentage ($\Sigma Q_{error\ \%}$)). The acceptable Total Error Percentage will be based on observed trends and known observations of the actual hydrocarbon storage site storage vessels and processing units. The $\Sigma Q_{error\ \%}$ is used subsequently in the process flow diagram as described below. As the of computer 100 continues to monitor hydrocarbon storage system 10, the $\Sigma Q_{error\ \%}$ will become an empirically defined value based on user experience initially and then monitored variance going forward as averaged based on trend analysis. (Those skilled in the art are familiar with operations which estimate the probable percent error based on experience and then, upon monitoring for a period of time, the operation readjusts the Total Error Percentage based on observations of actual errors reported while no emissions are physically observed.) In this method, the operator may decide to repeat the process of estimating the Total Error Percentage based on the user's experience. For example, changes in the following conditions may support updating the Total Error Percentage ($\Sigma Q_{error\ \%}$): a change in the fluid characteristics received at the hydrocarbons storage site, a change in atmospheric conditions at the hydrocarbon storage site, a change in temperature at the hydrocarbon site, a change in any of the processing units at the hydrocarbon storage site or other change which may result in a conversion of a generally liquid hydrocarbon to a gaseous hydrocarbon. Updating the Total Error Percentage improves accuracy in the performance of steps 13 and 14 by the mass balance operations. In Step 7, flowrate data from flow rate sensors 38 associated with primary separator 14a, for each of the aqueous phase ($Q_{water}$), liquid hydrocarbon phase ($Q_{oil}$) and gaseous hydrocarbon phase ($Q_{gas}$) exiting primary separator 14a is input to the simulator function of computer 100 and updated to the simulation-ready site schematic. The liquid hydrocarbons, gaseous hydrocarbons and aqueous phase subsequently pass through or into the units of Box A in FIGS. 2A and 3.

In Step 8, process simulator function runs the equations of state and determines in Step 9 the total flash volume (gaseous hydrocarbon evolution) for each of the liquid storage tanks such as, but not limited to, hydrocarbon storage tanks 12a (WO and produced water storage tanks 12b ($\Sigma W_{WT}$). Additionally, the volume of gas from any upstream separators, i.e. units that are downstream of the primary separator shown as 14a in exemplary FIG. 2A, may be included in the total flash values of Step 9, thereby Step 9 accounts for all expected gas evolving from units within Box A. For example, in FIG. 3, heater treater 16 and vapor recovery tower 32 would be downstream of a primary separator, not shown, and upstream of the two tank batteries 12a, 12b. Therefore, the data from heater treater 16 and vapor recovery tower 32 would be submitted to the process simulator function of computer 100. Step 10 may be performed inside of the process simulator function or outside of the process simulator function in the mass balance operations. In Step 10, data obtained from Step 9, determines the total volume of gas from the monitored units within Box A and provides it to Step 12 of the process simulator function or to the mass balance software which then provides the data to Step 12. The simulator function performs mass balance calculations (Step 10). In Step 11, for example data from Box B of FIGS. 2B and 3 is used to determine the Total Volume Metered (TVM) of gaseous hydrocarbons processed or handled by hydrocarbon storage system 10. This data is provided to the mass balance software by monitoring at least one of the following sensors: temperature sensor 36 and pressure sensor 34 and flowrate data from the flow meters 38, including virtual flow meter identified as VRU 38 associated with compressors 20, flare/scrubbers 24 and flares 26. In Step 12, the values of $\Sigma Q_{WT}$ and $\Sigma Q_{OT}$ generated by the simulator function are used in the calculation of the Process Simulator Rate (PSR). The PSR is that value which reflects the expected flow rate of evolving gas (flash gas) from the liquid hydrocarbons in the hydrocarbon storage tanks 12a plus the evolving gas (flash gas) from the produced water in the produced water storage tanks 12b as well as any treating units such as heater treaters or vapor recovery towers, i.e. Box A of FIG. 2A and FIG. 3. The PSR value and the TVM value can be used in connection with the $\Sigma Q_{error\ \%}$ in Step 13, performed by the mass balance software, to determine the Total Vent Volume ($\Sigma Q_{vent}$). Thus, in Step 13 the mass balance software performs a mathematical comparison of the gases expected to be evolved or flashed from units in Box A of FIGS. 2A and 3, as determined by the simulator function, to the monitored value of gases processed by units in Box B of FIGS. 2B and 3.

In general, the value produced by the simulator function in Step 12—the PSR value—will preferably equal the TVM value as this will reflect the transfer of all flash gas from Box A units to the units of Box B. However, actual operations typically lead to some loss of gases. Therefore, the value of $\Sigma Q_{vent}$ will then be used to determine whether or not an unacceptable level of gaseous hydrocarbons is escaping from the hydrocarbon storage system 10. The value of $\Sigma Q_{vent}$ is defined in Step 13 as $\Sigma Q_{vent}$=PSR−TVM± $\Sigma Q_{error\ \%}$. Thus, the $\Sigma Q_{error\ \%}$ accounts for the error in estimating flash gas with equations of state. Excess loss of flash gas indicates a leak somewhere in hydrocarbon storage system 10. Therefore, as noted in Step 14, if $\Sigma Q_{vent}$ is significantly greater than zero, including considering the value for $\Sigma Q_{error\ \%}$, computer 100 may optionally trigger an alert or a warning of excess venting, i.e. unwanted gas loss, alerting the user monitoring the webpage or GUI.

In this instance, the term "significantly greater than zero" will initially be a user defined term. However, as use of hydrocarbon storage system 10 continues, the value set for triggering an alert will become an empirical value based on learned operational characteristics of the use of hydrocarbon storage system 10 for the particular configuration of the site. By way of example, an initial value for "significantly greater than zero" might be a numerical amount such as >1 MCFD or >5 MCFD (MCFD is 1000 cubic feet per day). Then over the continuous operation of hydrocarbon storage system 10 and computer 100 for two or four weeks, computer 100 may establish a new value for the term "significantly greater than zero" which will be updated from time to time in a similar manner to adjusting the value of Total Error Percentage over time.

Finally, in the event of a triggered alert, computer 100 can assist in locating the potential gaseous hydrocarbon leak. In this mode, computer 100 examines the data stored overtime in the database and identifies gas pressures that are not consistent with historical norms. A pressure reading out of range for storage tanks 12a or 12b may reflect a loss of hydrocarbons through the venting system (not shown) of the identified storage tank. Additionally, flow rate data can be used to report the duration of the leak and to identify the sensor reporting the loss of pressure reflecting the potential presence and source point of the leak. In view of the ability to simulate and compare flash vapor evolution and recovery, this method and system will permit operators to certify capture and containment of gaseous hydrocarbons at hydrocarbon storage systems.

The following theoretical example will better demonstrate the method of identifying the source of a leak. Using the method of FIGS. 1A-C, the current method determined that a hydrocarbon storage site configured as depicted in FIG. 2A-B should process 192 MCFD of gas. The value of 192 MCFD was obtained using the method described above and data obtained from the following units located in Box A: storage vessel temp, storage vessel pressure, hydrocarbon (gaseous and liquid) flow rate from primary separators and the water flow rate from primary separators.

Thus, in this theoretical example, the process simulator estimated that the volume of gas processed would be 192 MCFD. As discussed above, the Total Percent Error for this system would be empirically determined. In this example, the Total Percent Error is assumed to be five percent of the total gas estimated.

For the purposes of this example, the theoretical measured volume of gas processed within Box B of the hydrocarbon storage site described in FIG. 2A-B was 154 MCFD. Therefore, the actual measured volume of gas is well outside of the estimated volume of 192 MCFD even when considering the Total Percent Error of 5%. Accordingly, at least one of the units found in Box A of FIG. 2A likely has an excessive leak or vent of gas to the atmosphere.

To determine the likely location of a leak, the system will review sensor data associated with the storage vessels and other units found within Box A. This review will look for sensor data that falls out of a normal range of values and will identify when that sensor recorded the out of range data. Upon completion of this review the operator of the hydrocarbon storage site will likely know which vessel is responsible for the leak. Typically, an onsite observation will confirm the unit responsible for the leak.

Other embodiments of the present invention will be apparent to one skilled in the art. As such, the foregoing description merely enables and describes the general uses and methods of the present invention. Accordingly, the following claims define the true scope of the present invention.

What is claimed is:

1. A method for identifying unwanted venting of gaseous hydrocarbons from a hydrocarbon storage system comprising the steps of:
   providing a database for storage of pressure, flow rate and temperature data;
   providing a central processor programmed to perform a process simulator function and mass balance operations, the process simulator function programmed to run equations of state and to receive data from said database for use in the equations of state;
   providing a site-specific schematic of said hydrocarbon storage system for use by said process simulator function;
   said site-specific schematic of said hydrocarbon storage system identifies at least one onsite unit selected from the group consisting of:
   a compressor associated with a hydrocarbon vapor recovery line;
   a flare associated with a hydrocarbon vapor recovery line;
   a flare associated with a crude oil storage tank;
   a flare associated with a produced water storage tank;
   a storage unit containing hydrocarbon vapors;
   a processing unit in said hydrocarbon storage system which produces or isolates hydrocarbon vapors;
   a temperature sensor associated with a storage unit containing hydrocarbon vapors, wherein each temperature sensor provides data to said database;
   a temperature sensor associated with a processing unit which produces or isolates hydrocarbon vapors, wherein each temperature sensor provides data to said database;
   a flow sensor associated with conduits into and out of each storage unit containing hydrocarbon vapors, wherein each flow sensor provides data to said database;
   a flow sensor associated with conduits into and out of each processing unit which produces or isolates hydrocarbon vapors, wherein each flow sensor provides data to said database;
   a flow sensor associated with conduits into and out of each compressor associated with a hydrocarbon recovery line, wherein each flow sensor provides data to said database;
   a flow sensor associated with conduits into and out of each compressor associated with a hydrocarbon storage tank, wherein each flow sensor provides data to said database;
   a flow sensor associated with conduits into and out of each compressor associated with a hydrocarbon processing unit, wherein each flow sensor provides data to said database;
   a pressure sensor associated with conduits into and out of each storage unit containing hydrocarbon vapors, wherein each pressure sensor provides data to said database;
   a pressure sensor associated with conduits into and out of each processing unit which produces or isolates hydrocarbon vapors, wherein each pressure sensor provides data to said database;
   receiving fluids;
   identifying the received fluids in terms of relative percentages of gaseous and liquid hydrocarbons and any aqueous fluids entering the hydrocarbon storage system;
   inputting the relative percentages of gaseous and liquid hydrocarbons and aqueous fluids of the received fluids into said database for use by said process simulator function;
   wherein each compressor processing a total gas volume;
   monitoring the total gas volume processed by each compressor using a virtual or real flow meter;
   setting a user defined total error percentage for the flow sensors (TOTAL ERROR %);
   using the flowrate data from each flow sensor as stored in the database, determine a total metered hydrocarbon vapor volume (TVM) handled by the hydrocarbon storage system;
   using the process simulator function to run the equations of state, compute the Process Simulator Rate in terms of volume handled by the hydrocarbon storage system where the Process Simulator Rate volume of the hydrocarbon storage system equals the total estimated volume of vapors flashing on site from any tanks or vessels producing or storing any liquid hydrocarbon that could change to gas and be fed to into a vapor recovery system;
   performing mass balance operations to compute a total vent volume of all storage and processing units in the hydrocarbon storage system where the total vent volume is Process Simulator Rate (PSR) −TVM±TOTAL ERROR %;
   determining if unwanted venting of gaseous hydrocarbons has occurred where unwanted venting is indicated when the total vent volume is greater than zero.

2. The method of claim 1, wherein the step of identifying the makeup of the hydrocarbons in terms of aqueous, gaseous and hydrocarbon fluids entering the hydrocarbon storage system is repeated and if the makeup of the hydrocarbons has changed, then the step of setting a user defined total error percentage for the flow sensors (TOTAL ERROR %) is repeated.

3. The method of claim 2, wherein the frequency of repeating the step of identifying the makeup of the hydrocarbons in terms of aqueous, gaseous and hydrocarbon fluids entering the hydrocarbon storage system is performed in response to a change in temperature as determined by any one of the temperature sensors found in said hydrocarbon storage system.

4. The method of claim 2, wherein the frequency of repeating the step of identifying the makeup of the hydrocarbons in terms of aqueous, gaseous and hydrocarbon fluids entering the hydrocarbon storage system is performed in response to a change in pressure as determined by any one of the pressure sensors found in said hydrocarbon storage system.

5. The method of claim 2, wherein the frequency of repeating the step of identifying the makeup of the hydrocarbons in terms of aqueous, gaseous and hydrocarbon fluids entering the hydrocarbon storage system is performed in response to a change in fluid flow rate as determined by any one of the flow sensors found in said hydrocarbon storage system.

6. A system for identifying venting of natural gas from a hydrocarbon storage system comprising:
a source of hydrocarbons;
a first separator in fluid communication with said source of hydrocarbons;
said first separator configured to provide an initial separation of said hydrocarbons into a first gas fraction, a first aqueous based fraction and a first liquid hydrocarbon fraction;
said first separator in fluid communication with a first gas separator, a heater treater and a produced water tank;
a first valve controls fluid flow from said first separator to said heater treater;
at least one oil tank in fluid communication with said heater treater;
said heater treater is in fluid communication with a gas line, at least one hydrocarbon storage tank and at least one produced water tank;
at least one pressure sensor positioned to monitor vapor pressure within said at least one hydrocarbon storage tank;
at least one pressure sensor positioned to monitor vapor pressure within said produced water tank;
a first temperature sensor positioned to monitor a temperature of the first separator;
a second temperature sensor positioned to monitor a temperature of the heater treater;
a third temperature sensor positioned to monitor a temperature of the produced water tank;
a fourth temperature sensor positioned to monitor a temperature of the hydrocarbon storage tank;
a first flow meter positioned to monitor a gas flow rate of a gas passing from the first separator to the first gas separator;
a second flow meter positioned to monitor a fluid flow rate of a fluid passing from the first separator to the heater treater;
a third flow meter positioned to monitor a produced water flow rate of produced water flowing from the first separator to the produced water tank;
a database configured to store data input from said at least one pressure sensor monitoring a pressure within said at least one hydrocarbon storage tank, said at least one pressure sensor positioned to monitor vapor pressure within said produced water tank, each of said first, second, third and fourth temperature sensors and each of said first, second and third flow meters;
a computer programmed with a process simulator function, said process simulator function utilizing equations of state which interpret the following variables:
pressure, flow rate and temperature;
said computer also programmed to display a schematic of said hydrocarbon storage system;
said computer also programmed to receive data from said database and to utilize the received data when running equations of state;
said process simulator function analyzes results produced by the equations of state and determines gas vent volumes from each of said hydrocarbon storage tank and said produced water tank to provide a total gas vent volume and to trigger an alert when the total gas vent volume is greater than a predetermined value.

7. The system of claim 6 for identifying venting of natural gas from a hydrocarbon storage system further comprising: a vapor recovery tower located between the heater treater and the oil tank.

* * * * *